United States Patent [19]

Wiesner

[11] 3,966,145

[45] June 29, 1976

[54] STRUCTURE FOR COOLING HELICOPTER TAIL ROTOR GEARBOX

[75] Inventor: Robert Wiesner, Broomall, Pa.

[73] Assignee: The Boeing Company, Seattle, Wash.

[22] Filed: Feb. 28, 1975

[21] Appl. No.: 554,296

[52] U.S. Cl. ................................ 244/17.11; 244/57
[51] Int. Cl.² ........................................ B64D 33/10
[58] Field of Search ........... 244/17.11, 17.19, 17.21, 244/57

[56] References Cited
UNITED STATES PATENTS

| | | | |
|---|---|---|---|
| 2,369,652 | 2/1945 | Avery | 244/17.21 |
| 2,383,038 | 8/1945 | Bossi | 244/17.21 |
| 2,447,486 | 8/1948 | Burke | 244/57 |
| 3,506,219 | 4/1970 | Mouille et al. | 244/17.21 |

Primary Examiner—Stephen G. Kunin
Assistant Examiner—Galen L. Barefoot
Attorney, Agent, or Firm—Joseph M. Corr

[57] ABSTRACT

A structure is provided for cooling the tail rotor gearbox of a single rotor helicopter having an anti-torque tail rotor mounted to a vertical stabilizer. The gearbox is mounted within the vertical stabilizer inside an air passage passing through the stabilizer. An air inlet is located in the vertical stabilizer on the side thereof opposite the tail rotor. An exhaust orifice is positioned in the vertical stabilizer on the same side of the stabilizer as the tail rotor. In operation the pressure differential over the vertical stabilizer caused by the rotation of the rotor causes ambient air to enter the inlet, pass through the passage, over the gearbox, and exit from the exit orifice thereby cooling the gearbox.

3 Claims, 5 Drawing Figures

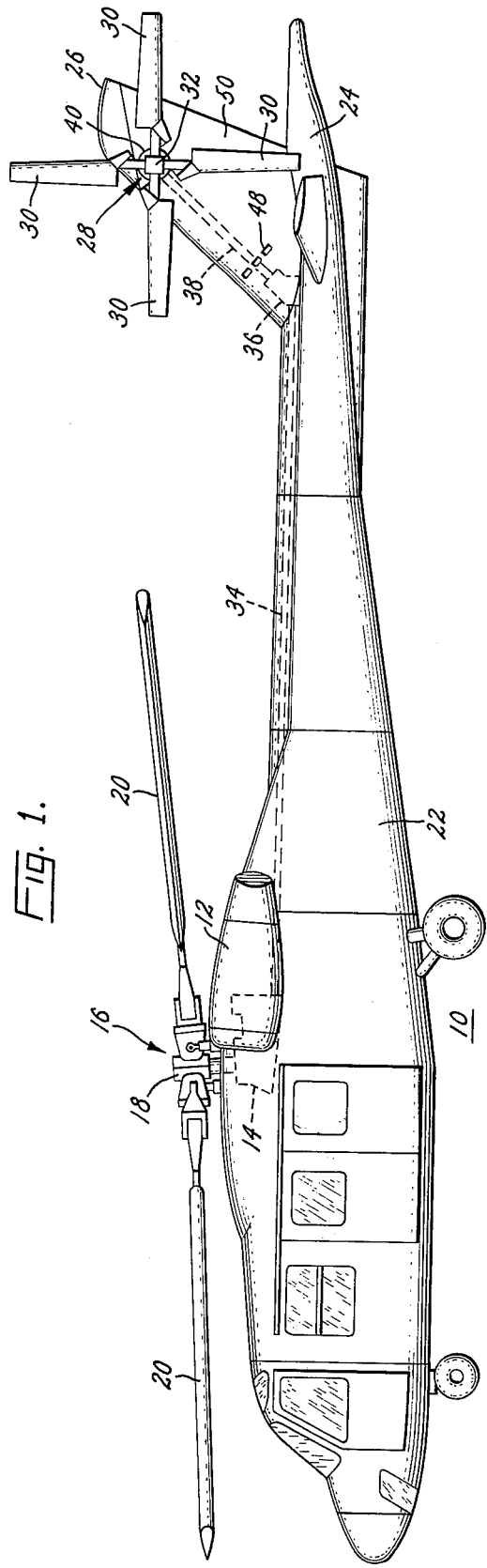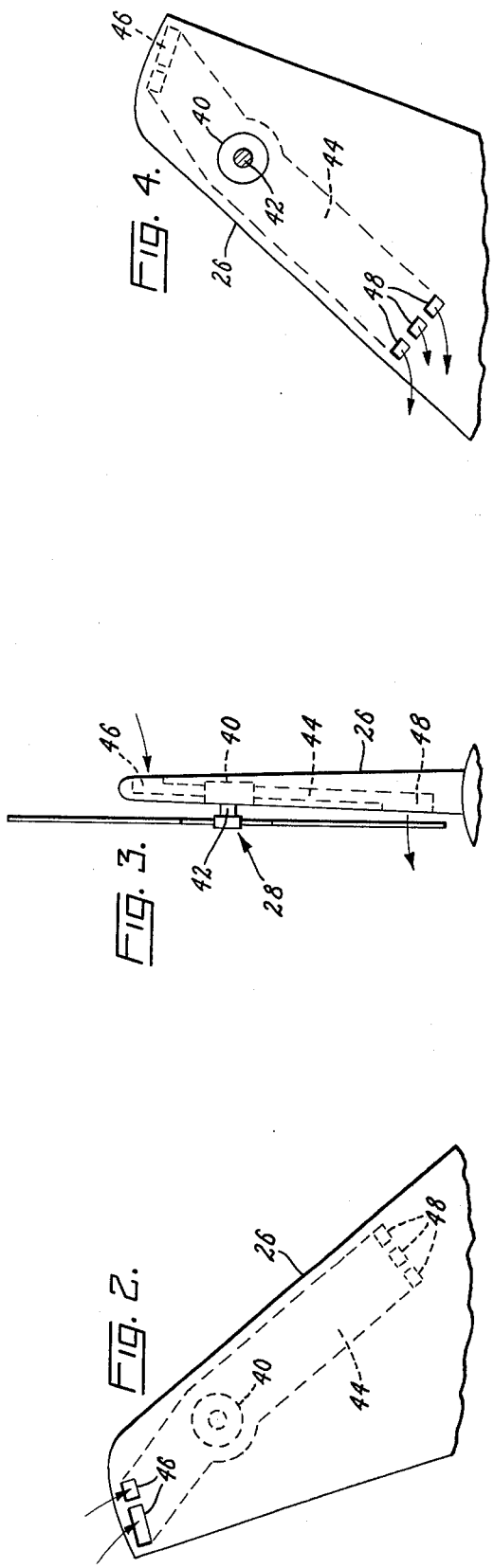

STRUCTURE FOR COOLING HELICOPTER TAIL ROTOR GEARBOX

BACKGROUND OF THE INVENTION

This invention relates to a structure to cool a helicopter tail rotor gearbox.

Helicopters having a single main-lifting rotor generally require a second smaller rotor to be mounted at the tail of the aircraft. This rotor is used to provide yaw or directional control and to counteract the torque generated by the driving of the main-lifting rotor. The tail rotor is generally driven by the same engine or engines which drive the main-lifting rotor. Since these engines are located near the main-lifting rotor, various drive shafts and gearboxes are required to transmit the power from the engines to the tail rotor.

Generally, a gearbox is required whenever the drive shaft transmitting the power changes direction. One such gearbox is located adjacent to the tail rotor hub and is connected to the rotor hub drive shaft. This particular gearbox changes the direction of the power train 90°.

The tail rotor receives maximum use at the hover condition. During hover, a maximum amount of power is required to counteract the torque generated by the driving of the main rotor. Although this torque must be conteracted during forward flight, the fuselage of the helicopter acts as a stabilizer thus providing some anti-torque. In helicopters having a vertical stabilizer, use of the tail rotor to counteract torque is minimized during high speed forward flight.

It is necessary to cool the tail rotor gearbox in order to increase its useful life and maintain its efficiency. Maximum cooling is required at hover and low speeds when the rotor tail is receiving maximum use. It is during the hover condition that cooling is difficult to achieve. One reason for this is the hover condition itself. It is common in the aircraft field to deflect outside ambient air over the part to be cooled. However, since a helicopter in hover is not moving forward, it is difficult to use outside ambient air for this purpose.

Helicopter tail rotors have generally been mounted either on an aft pylon or a vertical stabilizer, with the gearbox almost completely exposed to the air. In both cases, one of the methods to cool the gearbox has been simply to permit air which has been placed in motion by the rotation of the tail rotor to pass over the gearbox. One reason this has been ineffective has been the fact that the gearbox is located adjacent to the center of rotation of the tail rotor, a location where there is minimum air movement.

This method has been particularly ineffective where the gearbox has been mounted within the vertical stabilizer. When mounted in this manner the air has been unable to reach the gearbox due to the tail structure, which has compounded the problem by retaining the heat generated. A partial solution has been to permit the gearbox to protrude from the surface of the vertical stabilizer. This has helped but the gearbox is still positioned in a region of minimal air flow. Another disadvantage of this approach is that the protruding gearbox adds aerodynamic drag to the aircraft. This reduces the maximum speed at which the helicopter can travel and in general increases fuel consumption.

Another solution to the problem has been to force outside ambient air over the gearbox through the use of blowers. This has been of particular value in helicopters which have their gearbox located within the helicopter vertical stabilizer. However, a disadvantage to this approach has been that the power required to operate the blower reduced the energy available to power the aircraft. This is a significant factor since hover requires maximum power.

SUMMARY OF THE INVENTION

The cooling structure of the present invention includes the vertical stabilizer of the helicopter. The tail rotor gearbox is located in an air passage passing through the vertical stabilizer. The inlet to the passage is located toward the top of the stabilizer on the side opposite the tail rotor. An exit orifice for air leaving the passage is located toward the bottom of the stabilizer on the same side as the tail rotor. In operation, as the tail rotor rotates, it creates a pressure differential which causes air to flow through the passage passing about the gearbox thereby cooling it. The degree of cooling inherently varies with the cooling required. During hover when the tail rotor is required to produce maximum force, the greatest loads are placed on the gearbox causing it to reach its maximum temperature. However, since the rotor at this point is creating the greatest pressure differential, maximum air flow is passing through the passage thereby providing maximum cooling.

Therefore, it is an object of the present invention to provide structure which will cool the gearbox for a helicopter tail rotor which does not reduce the power available to drive the aircraft.

It is another object of the invention to provide structure which will cool a tail rotor gearbox and increase the efficiency of the tail rotor.

It is another object of the invention to provide a structure which will cool the gearbox of a helicopter tail rotor without increasing the drag of the helicopter during forward flight.

It is an additional object of the invention to provide structure which will vary the cooling of a gearbox for a helicopter tail rotor in accordance with the amount of heat which is produced by the gearbox.

Still another object of the invention is to provide structure which will cool the gearbox of a helicopter tail rotor when the gearbox is positioned within the vertical stabilizer of the helicopter without the use of auxiliary blowers.

BRIEF DESCRIPTION OF THE DRAWINGS

FIG. 1 is a side elevation view of a helicopter incorporating an embodiment of the present invention.

FIG. 2 is a schematic right side view of the vertical stabilizer shown in FIG. 1.

FIG. 3 is a schematic rear view of the vertical stabilizer shown in FIG. 1.

FIG. 4 is a schematic left side view of the vertical stabilizer shown in FIG. 1.

DESCRIPTION OF THE PREFERRED EMBODIMENTS

Figure 5:
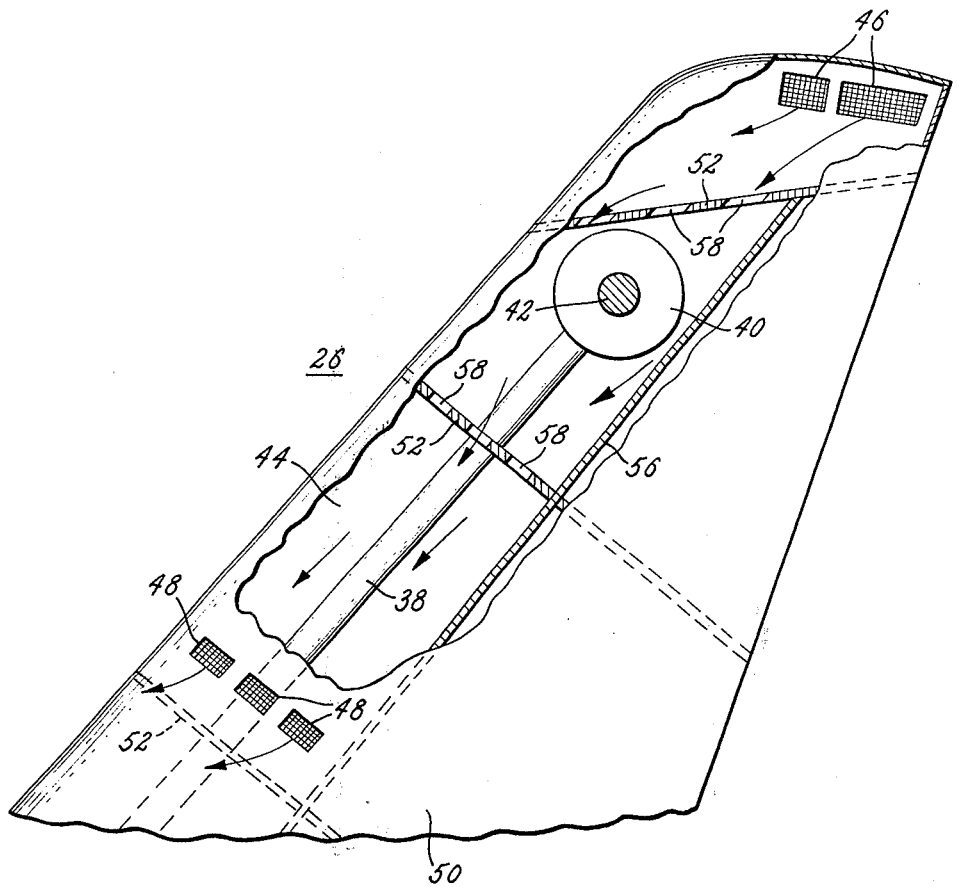
FIG. 5 is a side elevation view, partially broken away, of the vertical stabilizer shown in FIG. 1.

FIG. 1 depicts a helicopter 10 incorporating the present invention. The helicopter includes engines 12 which are connected to a transmission 14. The transmission is connected to the rotor 16. The rotor includes a hub 18 and blades 20. The helicopter 10 includes a fuselage 22 including an aft portion 24. Mounted to the aft portion 24 is a vertical stabilizer 26. Connected to the vertical stabilizer is a tail rotor 28. The tail rotor includes blades 30 which are connected a hub 32.

The tail rotor is also driven by engines 12. Power is transmitted from the transmission 14 to the tail rotor 28 by a drive shaft 34. Drive shaft 34 is connected to an intermediate gearbox 36. A tail drive shaft 38 is connected to a intermediate gearbox 36 and to a tail rotor gearbox 40. The tail rotor hub 32 is connected to the tail rotor gearbox 40 by the rotor drive shaft 42.

As will be understood by those skilled in the art, the main rotor 16 and the tail rotor 28 of helicopters of this type operate at a constant speed or constant rpm. The magnitude of the force generated by each rotor is varied by changing the pitch angle of the blades. In both rotors 16 and 28 the blades 20 and 30, respectively, are pivotally mounted to the hubs 18 and 32.

As viewed from the top of the helicopter, the main rotor 16 rotates in a counter clockwise direction. The driving of the rotor in this direction causes the body of the helicopter 10 to rotate in a clockwise direction. This torque is counteracted by the tail rotor 28 which generates a force tending to rotate the helicopter in a counter clockwise direction. During hover it is the tail rotor 28 which generates all the force required to counteract the torque generated in driving the main rotor. When the helicopter is in forward flight, the vertical stabilizer 26 aerodynamically generates a force which tends to counteract the torque. Thus, it may be seen that the maximum force generated by the tail rotor occurs at the hover condition. This maximum force is generated by increasing the pitch of the blades. This increases the force of power transmitted along the drive shaft 34, intermediate gearbox 36, tail drive shaft 38 and tail rotor gearbox 40. It is the primary object of the present invention to cool the tail rotor gearbox 40.

A schematic representation of the present invention is shown in FIGS. 2, 3, and 4. The tail rotor gearbox 40 is shown positioned in the vertical stabilizer 26. A passage or duct 44 is shown passing through the vertical stabilizer 26. An inlet 46 and an outlet 48 are shown at opposite ends of the passage. The tail rotor gearbox 40 is positioned within the passage 44. As will be easily understood, the gearbox 40 is cooled when air is passed through the passage 44. As may be seen in the rear view depicted in FIG. 3, the inlet 46 is located toward the top on the vertical stabilizer of the side thereof opposite the tail rotor. The outlet is located on the same side of the vertical stabilizer on which the tail rotor 28 is mounted. Rotation of the tail rotor in this view causes air to flow from the right to the left thereby generating a force tending to move the tail of the aircraft to the right. Air flowing from right to left enters the inlet 46, passes through the passage 44, passes the gearbox 40 and exits through outlet orifice 48. It is important to the present invention that the pressure differential between the inlet 46 and the outlet 48 be maximized. The greater the pressure differential, the greater the speed which air moves through passage 44. This increases the air flow and the cooling capability of the structure. The maximum pressure differential is achieved when the outlet 48 is positioned in a region of minimum pressure. This region is generally located at a distance from the center rotation of the tail rotor equal to three-fourths the radius of the rotor. The inlet 46 may be positioned anywhere on the side of the vertical stabilizer 26 opposite the tail rotor without affecting the magnitude of the pressured differential generated by rotation of the tail rotor. The inlet 46 is located toward the top of the vertical stabilizer 26 due to other design considerations, such as maintaining passage 44 with as few turns as possible.

The particular tail rotor shown herein is of the "pusher" type, by this it is meant that the air displaced by the rotor is pushed away from the vertical tail. In a "tractor" rotor, the air which is displaced by the rotor is pulled toward the vertical tail. With either type of rotor, the orifices should be located at the points which provide maximum differential pressure. This generally means that the orifice located on the same side of the vertical tail as the tail rotor should be located a distance equal to three-fourths the rotor radius from the center of rotation of the rotor.

The air passage 44 in which the tail rotor gearbox 40 is located may be a separate duct within the vertical stabilizer 26 as shown in FIGS. 2, 3 and 4 or it may be formed by the structure of the vertical stabilizer itself. This latter embodiment of the invention is shown in FIG. 5. The vertical stabilizer 26 has aerodynamic surfaces formed by skins 50. The inlet 46 and the exit 48 is formed in the skins 50 as shown. The skins are connected to the bulkheads 52 and longerons, not shown, which run from bulkhead to bulkhead. The primary structural and load carrying member of the vertical stabilizer is spar 56. The bulkheads 52 are connected to the spar 56 which extends the entire length of the vertical stabilizer. The bulkheads 52 forward of the spar 56 have holes 58 formed therein thus permitting air to pass through. It may thus be seen that air will enter inlet 46 pass through the cavity formed by the skins 50, spar 56 bulkheads 52, through the holes 58 in the bulkheads, pass the tail rotor gearbox 40, and then pass through exit orifice 48.

While the invention has been illustrated and disclosed with reference to a preferred embodiment, it is to be understood that various changes and modifications may be made to the invention as disclosed without departing from the spirit of the invention.

What is claimed is:

1. In a helicopter comprising a fuselage, a rotary wing system and a vertical stabilizer comprising a spar, a first skin connected to said spar and forming one side of said stabilizer and a second skin connected to said spar and forming the other side of said stabilizer, the combination of an anti-torque tail rotor and cooling system comprising a tail rotor connected to said vertical stabilizer, a gear box located within said stabilizer and operably connected to said tail rotor, an air passage located within said stabilizer and in communication with said gear box, wherein said air passage is formed by said spar, said first skin and said second skin air inlet means located in the vertical stabilizer and at one end of said passage, air outlet means located in said stabilizer and located at the other end of said passage, whereby cooling air flows into said inlet means through said passage and about said gear box, and out/said outlet means upon rotation of said tail rotor.

2. The helicopter of claim 1 wherein said outlet means is located in said stabilizer at a point within the radius of said tail rotor.

3. The helicopter of claim 2 wherein said point is located substantially at three-fourths of said radius of said tail rotor from the center of rotation.

* * * * *